United States Patent
Krasij et al.

(10) Patent No.: US 6,660,422 B2
(45) Date of Patent: Dec. 9, 2003

(54) PROTON EXCHANGE MEMBRANE FUEL CELL EXTERNAL MANIFOLD SEAL

(75) Inventors: Myron Krasij, Avon, CT (US); Bryan F. Dufner, West Hartford, CT (US); Ronald G. Martin, Monson, MA (US)

(73) Assignee: UTC Fuel Cells, LLC, South Windsor, CT (US)

(*) Notice: Subject to any disclaimer, the term of this patent is extended or adjusted under 35 U.S.C. 154(b) by 196 days.

(21) Appl. No.: 09/882,750

(22) Filed: Jun. 15, 2001

(65) Prior Publication Data

US 2001/0055708 A1 Dec. 27, 2001

Related U.S. Application Data

(63) Continuation-in-part of application No. 09/599,795, filed on Jun. 22, 2000, now abandoned, which is a continuation-in-part of application No. 09/210,152, filed on Dec. 11, 1998, now abandoned.

(51) Int. Cl.[7] .............................. H01M 8/02; H01M 2/08
(52) U.S. Cl. .............................. 429/35; 429/36; 429/38
(58) Field of Search .............................. 429/35, 36, 38, 429/39

(56) References Cited

U.S. PATENT DOCUMENTS

| | | | | |
|---|---|---|---|---|
| 3,607,418 A | * | 9/1971 | Ortlieb et al. .................. | 429/35 |
| 4,774,154 A | * | 9/1988 | Singelyn et al. .............. | 429/36 |
| 5,264,299 A | * | 11/1993 | Krasij et al. .................. | 429/30 |
| 6,165,634 A | * | 12/2000 | Krasij et al. .................. | 429/35 |
| 6,451,469 B1 | * | 9/2002 | Nakamura et al. ............ | 429/36 |

FOREIGN PATENT DOCUMENTS

| | | | | |
|---|---|---|---|---|
| JP | 58-112269 | * | 7/1983 | ............ H01M/8/24 |
| JP | 63-205060 | * | 8/1988 | ............ H01M/8/24 |
| JP | 7-263014 | * | 10/1995 | ............ H01M/8/24 |

* cited by examiner

Primary Examiner—Stephen Kalafut
(74) Attorney, Agent, or Firm—M. P. Williams

(57) ABSTRACT

A sealant system 13 for a manifold 10 of a proton exchange membrane fuel cell includes low temperature cured or heat cured silicone rubber bridges 14, 14a, 14c between the end plates 9 to compensate for the uneven edges of various fuel cell component layers, and a layer 15 of silicone rubber foam or sponge, or a molded silicone rubber gasket 15a, extending across the bridges and along the end plates, around the entire contact perimeter surfaces of the manifold, to seal the manifold to the fuel cell. The cured silicone rubber may extend along the end plates between the bridges. A rubber strip 20 may be adhered to the silicone rubber bridges and end plates. The bridges may comprise a first layer 22 of low shrinkage self-leveling RTV liquid rubber with viscosity in the range of 10,000–20,000 cps and a second layer 14 of RTV liquid rubber.

21 Claims, 3 Drawing Sheets

PROTON EXCHANGE MEMBRANE FUEL CELL EXTERNAL MANIFOLD SEAL

CROSS REFERENCE TO RELATED APPLICATIONS

This patent application is a continuation-in-part of U.S. patent application Ser. No. 09/599,795 filed on Jun. 22, 2000, in turn a continuation-in-part of U.S. patent application Ser. No. 09/210,152, filed Dec. 11, 1998 both now abandoned.

TECHNICAL FIELD

This invention relates to a multi-part rubber/elastomer seal system for a proton exchange membrane (PEM) fuel cell reactant gas manifold.

BACKGROUND ART

A basic fuel cell comprises an anode electrode spaced apart from a cathode electrode with an electrolyte disposed therebetween in a compartment formed between the two electrodes; each electrode also includes a catalyst layer on the electrolyte side thereof. On the non-electrolyte side of the anode electrode is a reactant gas chamber for carrying a fuel, and on the nonelectrolyte side of the cathode electrode is a reactant gas chamber for carrying an oxidant. The electrodes are constructed so that the gas diffuses therethrough and comes into contact with the electrolyte in the catalyst layer thereby causing a well-known electrochemical reaction whereby hydrogen ions and electrons produced at the anode travel from the anode electrode through, respectively, the electrolyte and the external circuit to the cathode electrode where they react with oxygen to produce heat and water. This flow of electrons is the electric current produced by the cell.

In a fuel cell power plant a number of fuel cells are connected electrically in series through plates separating adjacent cells, thereby forming a cell stack assembly (CSA). These plates in combination with the electrodes adjacent thereto, generally define the reactant gas passages or chambers. The CSA is provided with external fuel and oxidant manifolds for simultaneous supply to and exhaust of gases from the individual cells. Accordingly, it is necessary to provide manifold-to-CSA seals to prevent leakage of the gases involved in the operation of the fuel cell stack assembly. Also, during operation of the CSA, the CSA and the manifold-to-CSA seals undergo compressive creep. Thus, since the CSA is made up of a series of cells, the edges of which are not aligned, and the surface of the stack is therefore rough, compressive creep of the stack and the manifold-to-CSA seals results in increased reactant leakage.

Seals for phosphoric acid fuel cells as shown in commonly owned U.S. Pat. No. 4,774,154, have successfully employed a composition which includes a high fluorine content fluorinated hydrocarbon elastomer, a carbon black filler, azodicarbonamide blowing agent and blowing agent promoter, and an epoxy or inorganic oxide acid acceptor. However, this composition cures in the range between 176° C. and 204° C. (350° F. and 400° F.). Since the proton exchange membrane is generally damaged above about 150° C. (about 300° F.), curing the prior seal compound would destroy a PEM fuel cell.

PEM fuel cells known to the prior art have utilized closed cell, neoprene rubber foam to accommodate the uneven surface of the side of the fuel cell stack. However, this material exhibits poor springback characteristics, resulting in increased leakage as a function of time and a requirement to continuously tighten the manifolds.

DISCLOSURE OF INVENTION

Objects of the invention include a manifold seal system for a PEM fuel cell stack assembly which can be effected at stack temperatures not exceeding 150° C. (300° F.), which is stable in the presence of hydrogen, oxygen and water, which has low creep and which is very compressible.

According to the present invention, a manifold seal system for a PEM fuel cell comprises at least two parts, including one or two layers of silicone rubber applied to provide smooth bridges between one stack end plate (sometimes referred to as "pressure plate"), and the opposite end plate, there typically being one such bridge along each edge of the stack, another part comprising an elastomer adjacent to the reactant manifold, said elastomer having a low compression set (low creep), that is, below 25%, and a low compression modulus (being very springy), that is, capable of compressing about 25% under loads of less than 50 psi.

In one embodiment employing low temperature curing silicone rubber, an additional part comprises a rubber strip in contact with the end plates and in contact with the silicone rubber bridges; a bead of silicone rubber as used on the bridges may also be added under the rubber strip along the end plates, if required for leveling purposes. In accordance with one embodiment of the present invention, the cell bridges may comprise a two-part silicone rubber capable of curing at room temperature or a one-part silicone room temperature vulcanizing silicone rubber adhesive. In one embodiment, the bridges comprise two different room temperature curing silicone rubbers: first, a controlled quantity of a compatible liquid silicone rubber, having low shrinkage characteristics, a low viscosity and self-leveling capability is applied to the stack surface; this is followed by a higher viscosity, liquid rubber to fill the larger voids and crevices of the stack surfaces and to act as a bonding agent for the strip of pre-cured solid rubber.

In another embodiment, a bead of heat-cured silicone rubber sealant is applied between and on the end plates and cured with a heated platen, to a thickness determined either by shims or by volume/pressure control.

The elastomer may comprise closed cell silicone rubber foam of low to medium density, or closed cell silicone rubber sponge, but the preferred embodiment is a molded silicone rubber gasket. As used herein, "low density foam" means a foam that exerts a pressure of about 2–5 psi at a deflection of 25% while "medium density foam" exerts a pressure of about 10–20 psi at a deflection of 25%. A low density foam also has a bulk density of about 0.15–0.25 grams per cubic centimeter and a medium density foam has a bulk density of 0.25–0.35 grams per cubic centimeter. The compression set of the seal material should be less than 35% after 72 hours at 190° F.; this is defined as "low compression set" herein. The preferred range of thickness is between $\frac{1}{16}$ of an inch and $\frac{3}{16}$ of an inch.

The invention provides an effective seal to the fuel cell for all pressure differentials experienced by the seal during fuel cell operation, without leaking, and does not require periodic tightening of a manifold to maintain the seal over time. The sealing system of the invention allows easy removal of the manifold, should it be required.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
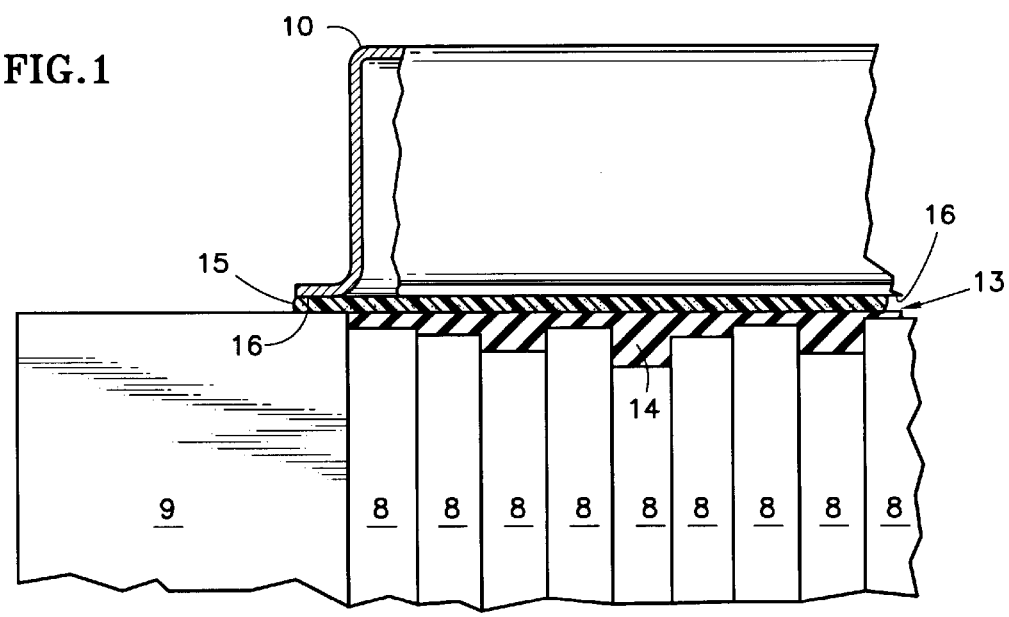
FIG. 1 is a partial, partially broken away and sectioned, front elevation view of a fuel cell having a seal according to one embodiment of the invention.
Figure 2:
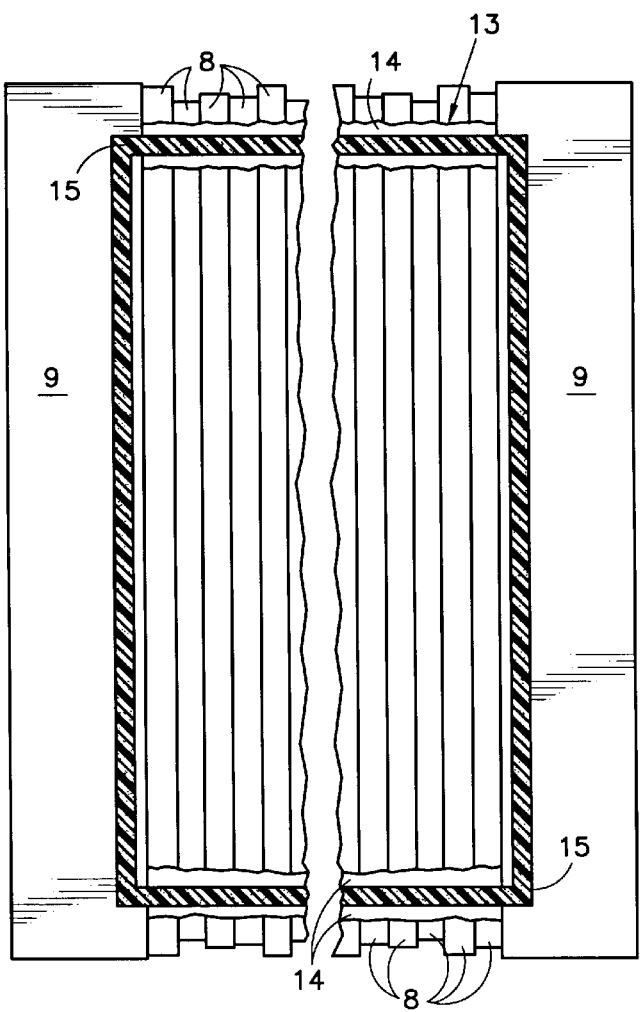
FIG. 2 is a fragmentary, partially sectioned, top plan view of the fuel cell of FIG. 1, with the manifold of FIG. 1 removed.

Referring to FIGS. 1 and 2, the fuel cell component elements 8 of a PEM fuel cell are depicted stylistically, and, as is known include, for each cell, a membrane, an anode substrate, an anode catalyst, a cathode substrate, a cathode catalyst, an anode flow field plate and a cathode flow field plate; a cooler plate may be interspersed between each cell or each group of three to four cells. The positions of the edges of these elements are irregular as shown in FIG. 1, giving rise to one aspect of the problem with providing an adequate seal system for a PEM fuel cell. The elements 8 are sandwiched between end plates 9, which are bolted together so as hold the various layers in tight contact with one another. A reactant gas manifold 10 (shown in FIG. 1) is positioned above the elements 8 so as to provide flow of reactant gas (either oxygen containing oxidizing gas or hydrogen containing fuel gas) to and from the flow field plates so as to bring the reactant gases to the anode and cathode, respectively.

The seal system 13 of this embodiment of the invention includes (a) a first part comprising bridges 14 of low temperature cured silicone rubber, which provide a straight, smooth surface coplanar with the adjacent sealing surfaces of the end plates 9, and (b) a second part comprising a layer 15 of silicone rubber foam or sponge or a molded solid seal beneath the entire contact perimeter surface 16 of the manifold 10. The bridges 14 may be made of two-part low temperature curing silicone rubber, or one-part low-temperature-curing, that is less than 200° F., and preferably room temperature curing silicone rubber adhesive/sealant, such as GE RTV 118. The layer 15 may preferably comprise a molded elastomeric seal of closed cell silicone foam, such as ROGERS PORON® BF-1000 silicone foam, or JA-BAR JB 0202 silicone sponge. However, other materials may be used, so long as they are compatible in the fuel cell environment, the seal system can be perfected at temperatures which will not harm the membrane (that is, maintaining cell stack temperature below about 90° C., or 194° F.), they have low creep under load, and they are very compressible.

The seal system 13 of this embodiment of the invention may be formed by first applying low temperature curing silicone rubber directly to the edge of the stack elements 8, thereby creating the bridges 14, and allowing the bridges to cure. This provides the flat, relatively smooth surface above the elements 8, coplanar with the adjacent sealing surfaces of the end plates 9, in the regions where the manifold 10 crosses over from one end plate to the other as seen in FIG. 2. The term "relatively smooth" means smooth enough to form an adequate seal. Then, the silicone rubber molded seal or foam or sponge 15 can be applied over the bridges 14 and end plates 9, with the manifold 10 thereafter being drawn tightly toward the CSA by means of conventional tie rods, not shown. Forming the bridges 14 first, and then positioning layer 15 and the manifold onto the fuel cell makes it easier to remove the manifold later, should it be necessary. If any of the elements 8 extend above the end plates 9, material may be applied to the end plates to ensure that the sealing surface of the end plates and the bridge surfaces provide a planar surface for mating with the manifold and/or its seals.

Figure 3:
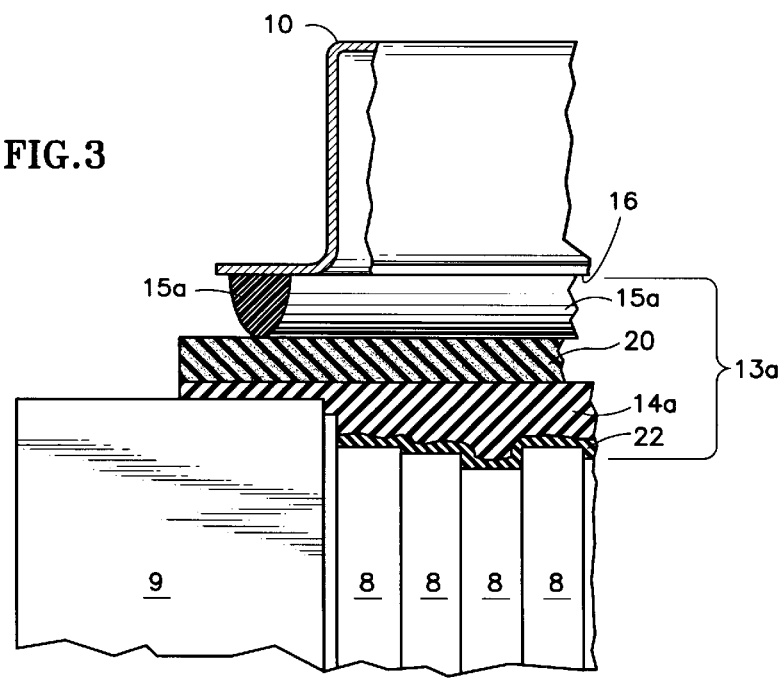
FIG. 3 is a partial, partially broken away and sectioned, front elevation view of a fuel cell having a seal according to a second embodiment of the invention.
Figure 4:
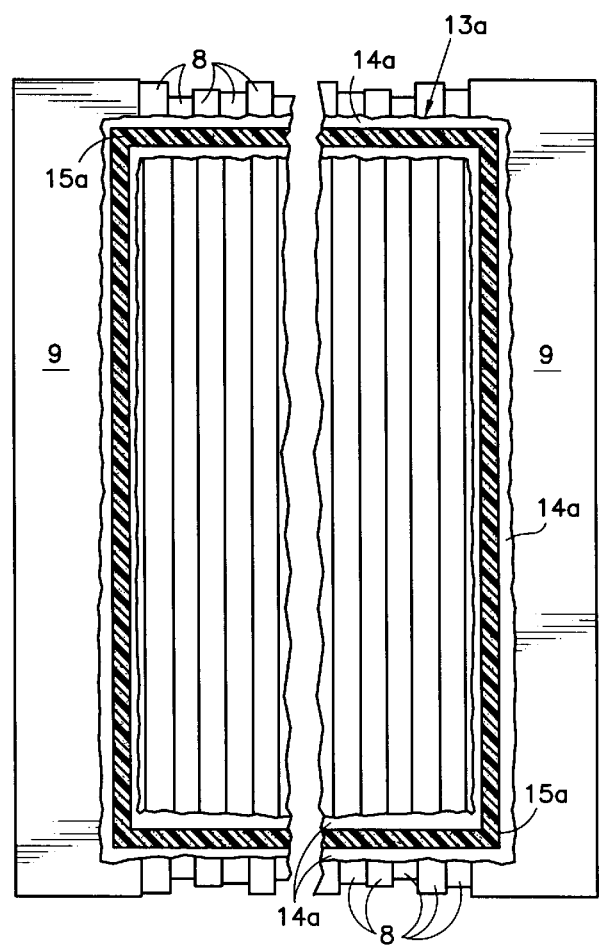
FIG. 4 is a fragmentary, partially sectioned, top plan view of the fuel cell of FIG. 3 with the manifold removed.

In a second embodiment shown in FIG. 3, a seal system 13a comprises a second part having a molded silicone rubber seal 15a, instead of a layer of silicone rubber foam or sponge 15, used in conjunction with a rubber strip 20. The seal 15a is preferably bonded to the contact surface 16 of the manifold 10. In addition, the seal system 13a comprises a layer 22 of a compatible liquid rubber, such as GE RTV 118 or Shin Etsu KE3476T, having low shrinkage characteristics and a low viscosity in a range of 10,000–20,000 cps. The layer 22 is first applied to the stack surface, either manually or with automatic dispensing equipment, and allowed to spread and fill the very fine voids and crevices between the cell components on the stack surface. After the layer 22 is applied, the higher viscosity liquid rubber layer 14a, typically GE RTV 108, is applied as necessary to fill the larger voids and crevices of the stack surface, and on the end plates 9, as shown in FIGS. 3 and 4, to provide an essentially smooth and flat single seal surface including the bridges between the end plates 9 and the sealing surfaces on the end plates 9. The layer 14a may also act as a bonding agent for the strip 20 of pre-cured, solid rubber, which is typically ROGERS PORON® HT1451.

Figure 5:
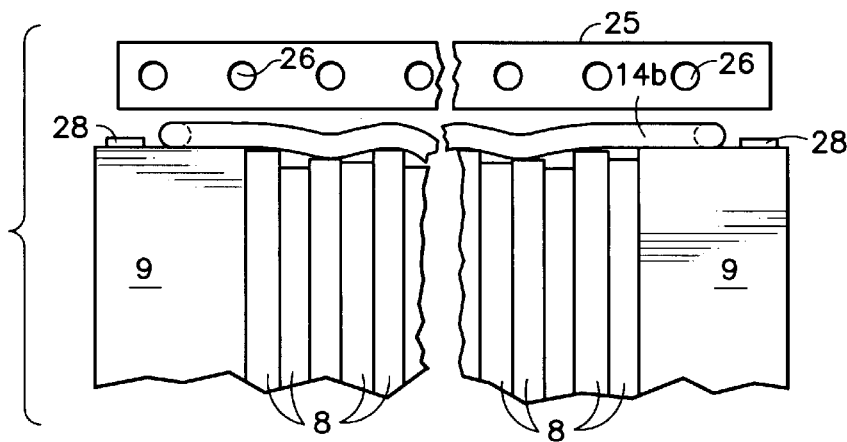
FIG. 5 is a fragmentary, side elevation view of a fuel cell stack with a bead of heat curing silicone rubber sealant before being cured.

Referring to FIG. 5, a bead 14b of heat curing silicone rubber sealant, such as PARKER SEALS S1936-45 is placed over the elements 8 at each end of the fuel cell stack and along both end plates 9 (so as to ultimately form a rectangular seal of a shape similar to the seal 14a of FIG. 4). A conventional heated platen 25 has heating elements 26. A number of shims 28 are disposed at various points along the end plates of the fuel cell stack so as to limit the advancement of the platen 25 toward the fuel cell stack.

Figure 6:
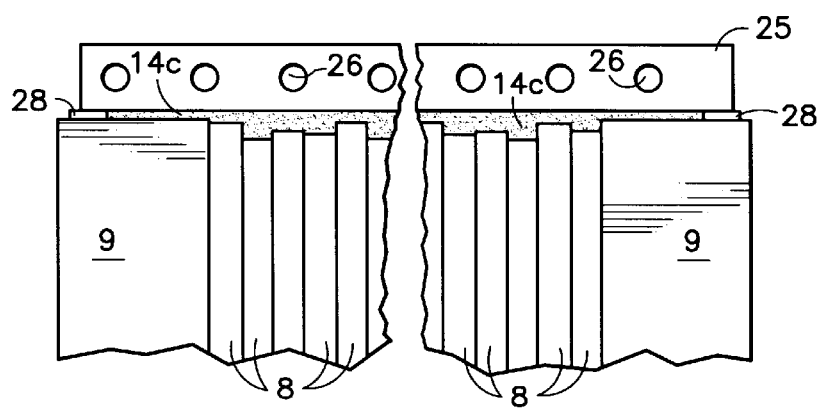
FIG. 6 is a fragmentary, side elevation view of a fuel cell stack with the heat curing silicone rubber sealant being cured by a heated platen.
Figure 7:
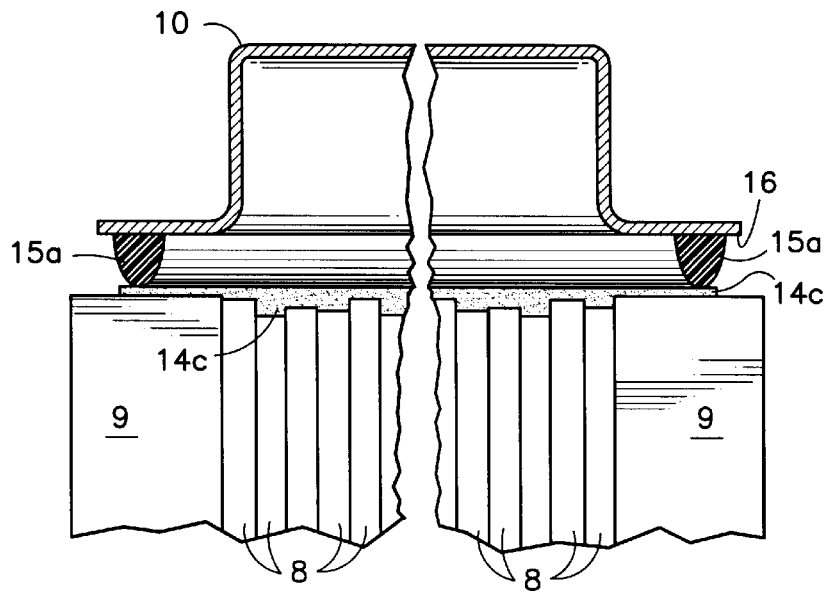
FIG. 7 is a fragmentary, partially sectioned, side elevation view of a fuel cell stack with a gasket sandwiched between a manifold and heat cured silicone rubber.

In FIG. 6, the heated platen 25 is shown having been pressed against the shims 28 as the heat curing bead of silicone rubber 14b is cured into the seal 14c of FIG. 6. In one embodiment, the cure may comprise a platen maintained at about 280° F. (about 140° C.) for about thirty minutes. Since the sealant is insulative, that portion of it which is in contact with the elements 8 of the fuel cell stack will generally not be at the cure temperature for the full thirty minutes; in any event, if the sealant were at the cure temperature for thirty minutes, this would not harm the fuel cell stack. Because the fuel cell stack comprises an essentially room temperature heat sink, the amount of heat transferred through the curing sealant 14c to the elements 8 is insufficient to raise the elements 8 above the safe maximum temperature therefor, which is around 150° C. (around 300° F.). When the curing is finished, the sealant 14c will have a pattern substantially like that of the sealant 14a in FIG. 4. When curing is complete, the manifold 10 can be mounted with the gasket 15a resting directly on the cured silicone rubber 14c, as is illustrated in FIG. 7.

Another heat curing silicone rubber which may be utilized for the sealant 14b is DOW-CORNING SILASTIC® 9280-50 liquid silicone rubber. This cures nearly instantly when the temperature reaches about 100° C. (about 212° F.).

The aforementioned patent is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A proton exchange membrane fuel cell assembly having a plurality of fuel cell component elements extending under compressive pressure between a pair of end plates, and having a reactant gas manifold, said elements having mutually uneven surfaces at ends thereof to which said manifold is to be sealed, comprising:

one or more first seal parts applied to said mutually uneven surfaces and extending from one of said end plates to the other of said end plates at one or more corresponding regions of said mutually uneven surfaces to which said manifold is to be sealed, said first seal parts each having a surface facing said manifold which is relatively smooth and substantially coplanar with sealing surfaces of said end plates to which said manifold is to be sealed, said first seal parts consisting of silicone rubber of at least one type; and a second seal part comprising an elastomer disposed adjacent the entire contact perimeter surface of said manifold, said elastomer having a low compression set and a low compression modulus.

2. An assembly according to claim 1 wherein said elastomer is a closed cell foam or sponge with a compressibility of 2–20 psi at 25 percent deflection, a compressive set of less than 35 percent at 25 percent deflection at 190° F., and a thickness of about 1/16 inch to 3/16 inch.

3. An assembly according to claim 1 wherein said elastomer is a silicone rubber foam closed cell sponge.

4. An assembly according to claim 1 wherein said elastomer is a molded silicone rubber gasket.

5. An assembly according to claim 1 wherein said one or more first seal parts comprise room temperature cured silicone rubber.

6. An assembly according to claim 1 wherein said one or more first seal parts comprise heat cured silicone rubber.

7. An assembly according to claim 1 wherein said one or more first seal parts comprise a first layer of a room temperature curing liquid rubber having self-leveling capability and a viscosity in the range of 10,000–20,000 cps applied to said mutually uneven surfaces and a second layer of room temperature curing liquid rubber applied to said first layer to fill the larger voids and crevices of the stack surface and to provide said relatively smooth surface facing said manifold.

8. An assembly according to claim 7 wherein:

said second layer extends onto said end plates from each end of one of said relatively smooth surfaces to each end of the other of said relatively smooth surfaces; and further comprising:

a precured rubber strip disposed on said second layer in facing relationship with said second seal part.

9. An assembly according to claim 8 wherein said second seal part is a molded silicone rubber gasket.

10. A method of sealing a perimeter surface of a reactant gas manifold to end plates and fuel cell component elements of a proton exchange membrane fuel cell, comprising:

(a) first, applying at least one type of silicone rubber to the regions of said fuel cell elements that are to be sealed to said manifold, to provide bridges having smooth, flat surfaces to which said manifold is to be sealed;

(b) then causing said silicone rubber to cure;

(c) thereafter providing an elastomer, having a low compression set and a low compression modulus; and (d) installing said manifold on said fuel cell with its entire contact perimeter surface in contact with said elastomer, said elastomer being between (1) said manifold and (2) said bridges and said end plates.

11. A method according to claim 10 wherein:

said step (c) comprises providing a silicone rubber foam or closed cell sponge.

12. A method according to claim 11 wherein:

said step (c) comprises providing a closed cell foam or sponge with a compressibility of 2–20 psi at 25 percent deflection, a compressive set of less than 35 percent at 25 percent deflection at 190° F., and a thickness of about 1/16 inch to 3/16 inch.

13. A method according to claim 10 wherein said steps (a) and (b) comprises first, applying, to said regions of said fuel cell elements, a first layer of low temperature curing liquid rubber having self-leveling capability and a viscosity in the range 10,000–20,000 cps, then causing said first layer to cure, and then applying a second layer of silicone rubber to said first layer to form said smooth straight surfaces, and then causing said second layer to cure.

14. A method according to claim 10 wherein said step (c) comprises providing a molded silicone rubber gasket.

15. A method according to claim 10 further comprising:

before said step (d), providing a strip of pre-cured solid rubber on said bridges and said end plates facing said elastomer.

16. A method according to claim 15 wherein said strip of precured solid rubber is adhered to said bridges prior to curing, and to said end plates, by a silicone rubber adhesive used in forming said bridges.

17. A proton exchange membrane fuel cell assembly having a plurality of fuel cell component elements extending under compressive pressure between a pair of end plates, and having a reactant gas manifold, said elements having mutually uneven surfaces at ends thereof to which said manifold is to be sealed, comprising:

a first seal part applied to said mutually uneven surfaces and extending from one of said end plates to the other of said end plates at one or more corresponding regions of said mutually uneven surfaces to which said manifold is to be sealed, as well as extending along each of said end plates forming a single seal surface of cured silicone rubber, which is relatively smooth and flat coextensive with and facing a seal surface of said manifold, said first seal part consisting of silicone rubber of at least one type; and a second seal part comprising an elastomer disposed adjacent the entire contact perimeter surface of said manifold, said elastomer having a low compression set and a low compression modulus.

18. An assembly according to claim 17 wherein said one or more first seal parts comprise room temperature cured silicone rubber.

19. An assembly according to claim 17 wherein said one or more first seal parts comprise heat cured silicone rubber.

20. An assembly according to claim 17 wherein said elastomer is a molded silicone rubber gasket.

21. A method of sealing a perimeter surface of a reactant gas manifold to end plates and fuel cell component elements of a proton exchange membrane fuel cell, comprising:

(a) first, applying at least one type of silicone rubber (1) to the regions of said fuel cell elements that are to be sealed to said manifold and (2) to said end plates between said regions, to provide a single seal surface which is relatively smooth and flat to which said manifold is to be sealed;

(b) then causing said silicone rubber to cure;

(c) thereafter providing an elastomer, having a low compression set and a low compression modulus; and (d) installing said manifold on said fuel cell with its entire contact perimeter surface in contact with said elastomer, said elastomer being between said manifold and said seal surface.

* * * * *